United States Patent [19]
Blonstein et al.

[11] Patent Number: 5,955,988
[45] Date of Patent: Sep. 21, 1999

[54] GRAPHICAL USER INTERFACE FOR ESTABLISHING INSTALLATION LOCATION FOR SATELLITE BASED TELEVISION SYSTEM

[75] Inventors: Steve Blonstein, Palo Alto; Jack Chaney, Gutroy; Fai-To Leung, Sunnyvale, all of Calif.

[73] Assignee: Samsung Electronics Co., Ltd., Suwon, Rep. of Korea

[21] Appl. No.: 08/749,271

[22] Filed: Nov. 13, 1996

Related U.S. Application Data

[60] Provisional application No. 60/023,904, Aug. 14, 1996.

[51] Int. Cl.$^6$ ...................................................... H04N 7/20
[52] U.S. Cl. .............................. 342/359; 348/569; 348/6; 348/10; 348/11; 342/359; 342/358; 342/357; 455/12.1; 455/6.2; 455/3.2; 455/67.7
[58] Field of Search ................................. 348/6, 10, 11, 348/192, 569; 455/3.2, 6.2, 6.3, 9, 12.1, 67.7; 342/359, 358, 357; H04N 7/20

[56] References Cited

U.S. PATENT DOCUMENTS

| | | | |
|---|---|---|---|
| 5,045,843 | 9/1991 | Hansen | 340/709 |
| 5,198,901 | 3/1993 | Lynch | 358/136 |
| 5,293,229 | 3/1994 | Iu | 348/415 |
| 5,311,310 | 5/1994 | Jozawa et al. | 348/426 |
| 5,359,348 | 10/1994 | Pilcher et al. | 345/158 |
| 5,361,105 | 11/1994 | Iu | 348/699 |
| 5,386,234 | 1/1995 | Veltman et al. | 348/409 |
| 5,400,076 | 3/1995 | Iwamura | 348/416 |
| 5,471,219 | 11/1995 | Rodeffer | 342/359 |
| 5,489,947 | 2/1996 | Cooper | 348/589 |
| 5,515,058 | 5/1996 | Channey | 342/359 |
| 5,617,101 | 4/1997 | Maine | 342/358 |
| 5,619,274 | 4/1997 | Roop | 348/461 |
| 5,629,626 | 5/1997 | Russell | 324/345 |
| 5,708,963 | 1/1998 | Mobley | 455/12.1 |
| 5,760,739 | 6/1998 | Pauli | 342/359 |
| 5,764,186 | 6/1998 | Yoo | 342/359 |
| 5,808,583 | 9/1998 | Roberts | 342/359 |

*Primary Examiner*—John K. Peng
*Assistant Examiner*—Wesner Sajous
*Attorney, Agent, or Firm*—Kenneth L. Sherman, Esq.; Sherman & Sherman

[57] ABSTRACT

A TV graphical user interface (GUI) is provided to enable a user to input antenna location information required for setting up a dish antenna. When the TV GUI is set in a dish set-up mode, the user may activate a U.S. map button to display a map of the United States or another area on the earth's surface. When a remote pointing device is directed at a point on the map that represents the current location of a satellite receiver, the TV GUI displays a regional map that shows in more detail a region where the receiver is located. When the user selects the receiver location within the regional map, the CPU determines the latitude and longitude values of the selected location, and calculates magnetic north and elevation angles for the antenna installation. To provide the user with visual feedback, the TV GUI may indicate the city nearest to the selected location, and a distance to the nearest city.

20 Claims, 8 Drawing Sheets

FIG. 3

| CLUT location | Red byte | Green Byte | Blue Byte | Output Color |
|---|---|---|---|---|
| S0 | S0 | S0 | S0 | Black |
| S1 | Sff | S0 | S0 | Full Red |
| S2 | S80 | S0 | S0 | Half Red |
| S3 | S40 | S0 | S0 | Dim Red |
| S4 | Sff | Sff | Sff | White |
| S5 | S80 | S80 | S80 | Med. gray |
| S6 | S00 | Sff | S00 | Full Green |
| S7 | S00 | S00 | Sff | Full Blue |
| S8 | S00 | Sff | Sff | Cyan |
| etc | etc | etc | etc | etc |

Setup Dish

Current Signal Strength

Location: 50 Miles south of Las Vegas NV.

0     802     100

800

Magnetic North     143

Elevation     046

Latitude     | 3 | 5 | .5 | N |  |

Longitude     | 1 | 1 | 4 | .8 | W |

Zipcode

Transponder No. 806 | 0 | 3 |     804

| U.S. Map | Cancel |

FIG.6

GRAPHICAL USER INTERFACE FOR ESTABLISHING INSTALLATION LOCATION FOR SATELLITE BASED TELEVISION SYSTEM

The present application claims the benefit of U.S. provisional application No. 60/023,904 filed Aug. 14, 1996.

TECHNICAL FIELD

The present invention relates to television (TV) systems, and in particular, to a novel TV graphical user interface (GUI) for setting up a satellite receiver antenna.

BACKGROUND ART

The growing availability of TV broadcast and interactive services creates a need for a new type of TV control system that would facilitate user access to options offered by TV program providers. For example, direct broadcast satellite services require users to make their selection among about a thousand TV channels with various TV programs and services. Direct television satellite broadcasting is provided via direct broadcast satellites at an uplink frequency of 17.3 to 17.9 GHz and a downlink frequency of 12.2 to 12.7 Ghz.

A digital satellite television system for direct television broadcasting includes a transmitter for transmitting television signals including video and audio components to a geostationary satellite. The satellite retransmits the received television signals to an outdoor antenna assembly that includes a dish-like antenna and a block converter. The dish-like antenna directs the received television signals to the block converter that converts the frequencies of the received television signals to respective lower frequencies.

The television signals produced by the block converter are connected via a coaxial cable to an indoor satellite receiver coupled to a TV set. The satellite receiver tunes, demodulates and otherwise processes the received television signals to provide video and audio signals with a NTSC, PAL or SECAM format suitable for processing by the TV set that produces an image on a display screen in response to the video signals, and an audible response by means of speakers in response to the audio signals.

Within the transmitter, analog video and audio signals are converted to respective digital signals compressed according to the Motion Picture Expert Group (MPEG) encoding standard. The resultant digital signals are represented by a stream of packets including error correction data. The type of packets is identified by a header code. Packets corresponding to control data may also be added to the packet stream.

In the MPEG standard, the video information may be transmitted in the form of a luminance (Y) component and two color difference (U and V) components. For example, the first color difference component may represent the difference between the red image information and the luminance image information (R-Y), and the second color difference component may represent the difference between the blue image information and the luminance image information (B-Y). In addition, the color information is compressed because the two color difference components correspond to more than one picture element. The use of color difference components and the sharing of the color difference components between picture elements reduces the transmission bandwidth.

The digital information resulting from the compression and error correction encoding is modulated on a carrier using Quaternary Phase Shift Keying (QPSK) modulation and transmitted to a satellite for transmission.

The satellite receiver comprises a tuner for selecting the appropriate carrier signal retransmitted by the satellite and for converting the frequency of the selected carrier to an intermediate frequency (IF) signal. A QPSK demodulator demodulates the IF signal and supplies it to an error-correcting decoder to correct demodulated packets representing video and audio information. An MPEG decoder decodes and decompresses video and audio packets to form digital video and audio signals supplied to a TV set. A TV set-top box serves to deliver compressed digital video and audio signals in real time usable form to one or more TV sets.

As discussed above, a digital satellite system uses a geostationary satellite for direct TV broadcasting. Such a satellite makes one revolution in 24 hours so as to remain synchronous with the earth's rotation. Thus, it remains fixed over a given place on the earth. To receive TV signals, a dish-like antenna should be pointed at the satellite. The pointing parameters of the dish-like satellite antenna depends on its installation location, i.e. on the location of the satellite receiver on the earth.

In a conventional satellite TV system, the manual entry of latitude and longitude values of a receiver location is required to set up a receiver dish-like antenna.

Another conventional approach is to input postal zipcode of a receiver location. The postal zipcode is transformed into central latitude and longitude values for a postal area.

In the both conventional methods, a receiver controller uses the latitude and longitude values to compute magnetic north and elevation values for antenna pointing.

However, when a satellite receiver is installed in a mobile object, users may have no information regarding zipcode or latitude and longitude values of a receiver location.

Also, it would be convenient for users to have graphical input means that do not require the manual entry of digital data to supply installation location information.

Therefore, it would be desirable to provide a TV graphical user interface (GUI) that eliminates the need for the manual entry of location data.

Further, when postal zipcode is entered, central latitude and longitude values for a postal area may substantially differ from actual latitude and longitude values of a receiver location. As a result, magnetic north and elevation values for antenna pointing may be calculated with an error higher than 2°.

Therefore, it would be desirable to improve the accuracy of defining a receiver location.

DISCLOSURE OF THE INVENTION

Accordingly, one advantage of the present invention is in providing a TV GUI that eliminates the need for the manual entry of antenna location data to set up an antenna.

Another advantage of the present invention is in providing a TV GUI that allows the accuracy of defining an antenna location to be improved.

The above and other advantages of the invention are achieved, at least in part, by providing a satellite TV system that comprises a satellite for direct TV broadcasting, and a receiver having a CPU, and an antenna for receiving TV signals from the satellite. A TV monitor controlled by the CPU displays a map showing an area that includes a location of the antenna. For example, a map of the United States may be displayed. To enter antenna installation location, a user may direct a pointing device at the antenna location on the map.

In accordance with a first aspect of the invention, when the pointing device is directed at the antenna location on the area map, the TV monitor may display a regional map showing a region of the antenna location in more detail than the area map.

In accordance with another aspect of the invention, the regional map may be arranged so as to have latitude lines perpendicular to longitude lines. When the pointing device is directed at the antenna location on the regional map, the CPU determines latitude and longitude values of the antenna location. Based on the determined latitude and longitude values, the CPU calculates parameters for pointing the antenna at the satellite. For example, magnetic north and elevation angles may be calculated to provide pointing of the antenna.

In accordance with a further aspect of the invention, the TV monitor may display an antenna set-up form that includes the pointing parameters calculated by the CPU. Also, to provide the user with a visual feedback, the antenna set-up form may indicate a distance from the antenna location to a selected place on the regional map. For example, mileage to the nearest city may be shown.

In accordance with another aspect of the invention, the TV monitor may display an indicator that indicates the strength of a current TV signal received from the satellite. Also, the antenna set-up form may indicate latitude and longitude values, and postal zipcode of the antenna location manually entered by the user.

In accordance with a method of the present invention, the following steps are carried out for providing a satellite receiver with position information for pointing an antenna at a satellite:

displaying a map showing an antenna location on a TV screen, moving a cursor to the antenna location, determining latitude and longitude values of the antenna location based on coordinates of the cursor, and calculating antenna pointing parameters using the latitude and longitude values of the antenna location.

The step of displaying a map may comprise displaying an area map showing an area that includes the antenna location. When the cursor is moved to the antenna location on the area map, a regional map may be displayed to show a region of the antenna location within this area.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

FIG. 3 illustrates contents of a color look up table.

FIG. 6 is a diagram illustrating a dish set-up form displayed on the TV screen.

BEST MODE FOR CARRYING OUT THE INVENTION

The best mode for practicing the invention is based on the realization of a satellite receiver in a digital satellite television system. However, it is to be understood that the present invention is applicable to any system for receiving TV signals.

Figure 1:
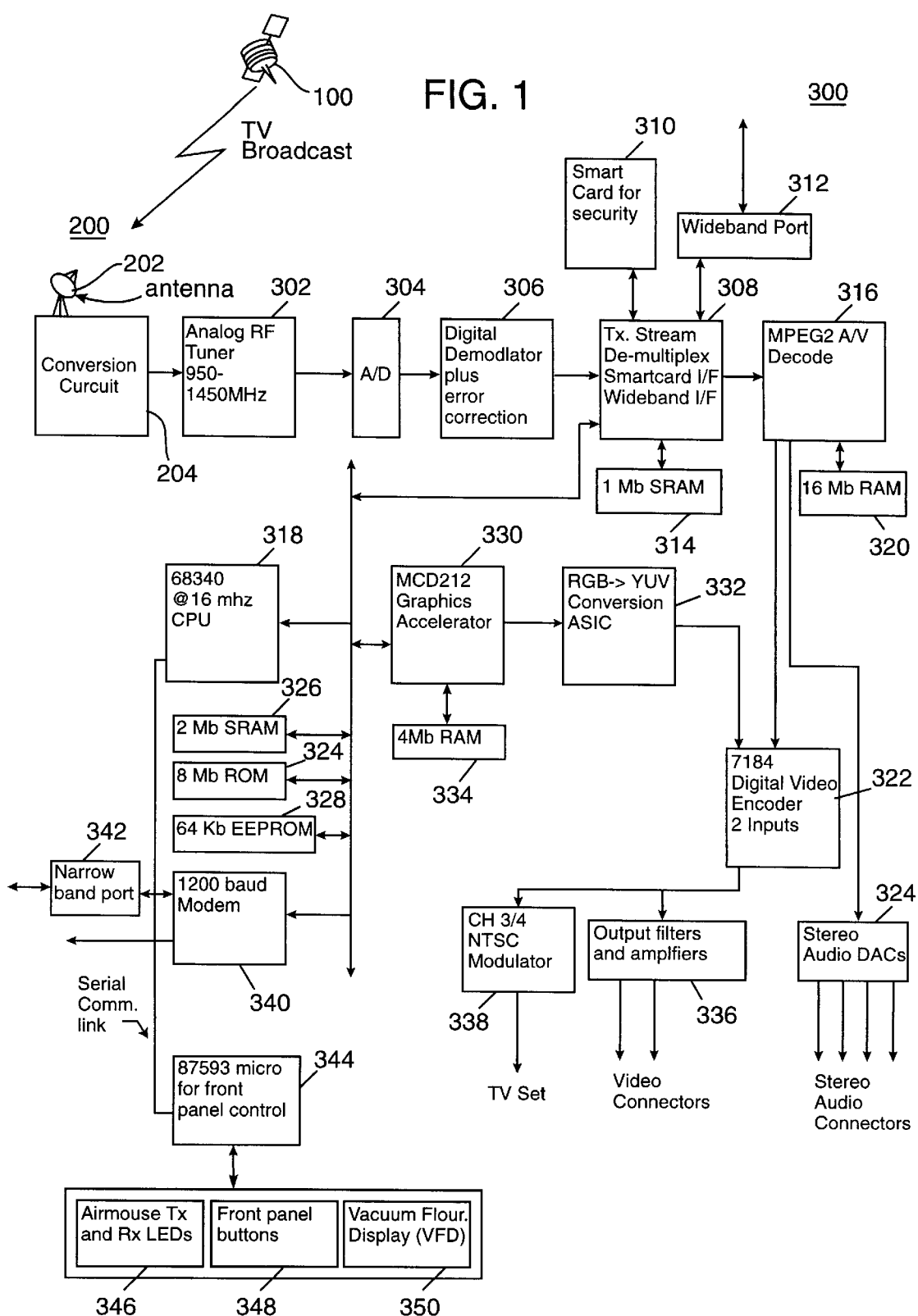
FIG. 1 is a block diagram of a satellite receiver of the present invention.

Reference is now made to FIG. 1 of the drawings wherein a digital satellite system includes a geostationary direct TV satellite 100 that transmits television signals to an outdoor antenna unit 200 including a 18" dish antenna 202 made of aluminum, and dual low noise block converters 204 that convert the satellite signals in a frequency range from 12.2–12.7 GHz received by the antenna 202 into the 950–1450 Mhz frequency range signals. Via an external UHF/VHF, the outdoor unit 200 is connected to an indoor satellite receiver 300 that includes an analog radio-frequency (RF) tuner 302 such as a satellite front end demodulator manufactured by Sharp/Comstream.

The RF tuner 302 equipped with a local oscillator and mixer selects the appropriate carrier signal corresponding to a selected satellite TV channel from the 950–1450 Mhz signals received from the outdoor unit. The frequency of the selected carrier is converted to an intermediate frequency (IF) signal fed to an analog-digital converter 304 that produces a digital IF signal.

A digital demodulator 306 performs QPSK demodulation of the digital IF signal and carries out multiple error correction algorithms required to decode error correction data contained in the received signal. For example, Viterbi and Reed-Solomon error correction algorithms may be employed. A single ASIC manufactured by Comstream may be used as the digital demodulator 306.

The decoded digital signal is fed to a transport chip 308 responsible for demultiplexing video, audio and data signals. The transport unit 308 is also connected to a card 310 for providing conditional access to the satellite receiver 300. The card 310, such as a Smart Card manufactured by the News Data Corporation, controls access to paid channels and services using the Data Encryption Standard (DES).

Wideband data are fed to the transport unit 308 via a wideband port 312 that provides compatibility with 16:9 wide NTSC format. The wideband port is also controlled by the conditional access system. A buffer 314 is used to support the transport chip operations. A 128Kx8 static random-access memory (SRAM) with access speed of 70 ns may be used as the buffer 314.

The transport chip 308 routes the video and audio signals to an MPEG decoder 316, while data is made available to a CPU 318. The MPEG decoder 316 provides decompression of the video and audio signals in accordance with the MPEG standard. For example, a single-chip STi3520 MPEG decoder may be used. By way of example, reference is made to U.S. Pat. No. 5,198,901 to Lynch of Mar. 30, 1993; to U.S. Pat. No. 5,293,229 to Iu of Mar. 8, 1994; to U.S. Pat. No. 5,311,310 to Jozawa et al. of May 10, 1994; to U.S. Pat. No. 5,361,105 to Iu of Nov. 1, 1994; to U.S. Pat. No. 5,386,234 to Veltman et al. of Jan. 31, 1995; and to U.S. Pat.

No. 5,400,076 to Iwamura of Mar. 21, 1995. Those disclosures and citations referenced therein may be consulted for an understanding of the specific details of conventional MPEG decompression arrangements.

The MPEG decoder 316 of the preferred embodiment is supported by a synchronous RAM 320 formed by four 256Kx16 DRAMs with access speed of 70 ns capable of holding 3 full frames of MPEG video and audio data, and control information.

Decompressed video data in YUV format is fed to a digital video encoder 322. The decompressed audio data is supplied to the video encoder 322 and to a stereo audio digital-to-analog converter (DAC) 324 for converting digital audio signals into analog form. A single-chip AK4319 DAC, manufactured by Asahi Kasei, may be used as the DAC 324.

Operations of the satellite receiver 300 are supported by the CPU 318 such as a Motorola 68340 CPU chip running at 16 MHz. An external watch crystal is used to derive the 16 MHz internal clock. The CPU 318 may have a 16-bit external data bus and a 32-bit data bus for internal operations. The CPU 318 may run the PSOS+ operating system developed by Integrated Systems Inc.

The CPU 318 is supported by a ROM 324, a SRAM 326 and an EEPROM 328. The ROM 324 that holds the PSOS+ operating system, menus, fonts, and other fixed data may be formed by two 4 Mbit masked ROM chips organized as 512Kx8 with access speed of 95 ns.

The SRAM 326 formed, for example, by two 1 Mbit SRAM chips organized as 128Kx8 with access speed of 70 ns, may be used for storing all active data such as system stacks, variables, menu data, etc. The ROM 324 and SRAM 326 may operate at a zero wait state to provide maximum performance.

The EEPROM 328, for example, a single 8Kx8 EEPROM chip with access speed of 150 ns, may store non-volatile data such as user preferences.

To enhance the graphics presentation capabilities of the satellite receiver 300, a graphics accelerator 330, such as a MCD212 graphics accelerator manufactured by Motorola, is used as a co-processor. The graphics accelerator 330 allows the receiver 300 to increase the rate of screen updates and to provide up to 256 colors in a graphics image. Also, the accelerator provides graphical effects such as wipes, dissolves, fades, etc. during transitions of menus on a TV screen, and supports operations of a remote pointing device such as an Airmouse®. This type of remote pointing device is manufactured by Seletech and Airmouse Remote Controls. The output of the graphics accelerator 330 produced in RGB format is fed to a converting circuit 332 for conversion into YUV format.

The graphics accelerator 330 may be supported by a synchronous 4 Mbit RAM 334 provided, for example, on a single 256Kx16 DRAM chip with access speed of 70 ns. The RAM 334 used for storing graphics data is capable of storing two graphics planes with 720x480 pixel resolution. The graphics accelerator 330 allows two graphics planes to be combined to produce various graphical effects.

The graphics data from the conversion circuit 332, and decompressed video and audio data from the MPEG decoder 316, are supplied to separate inputs of the digital video encoder 322 such as a single-chip Phillips 7184 encoder. The video encoder 322 is responsible for encoding digital video, audio and graphics data to produce a combined composite signal in NTSC format. For example, U.S. Pat. No. 5,489,947 to Cooper of Feb. 6, 1996, incorporated herewith by reference, discloses an on-screen display (OSD) arrangement that allows the graphics data to be displayed on a TV set screen together with the image represented by the received video signals, or in place of this image. A single control bit may be used by the video encoder 322 to switch its output from graphics data to video and back.

The video encoder 322 also produces baseband video and audio signals. The baseband video signals are buffered by a pair of video operational amplifiers 336 coupled to video connectors. The baseband audio signals are fed to the stereo audio DAC 324 for converting to analog format and supplying to audio connectors. The video and audio connectors may be coupled to such external devices as stereo receivers, TVs or VCRs.

The combined composite signal from the video encoder 322 may be fed to a NTSC modulator 338 that modulates the composite signal to either channel 3 or 4 of a TV set coupled to the modulator 338. The modulator 338 also allows the combined composite signal to bypass a cable/antenna input of the TV set. Operations carried out to display video and graphical images on the TV set screen will be described in more detail later.

The TV set coupled to the satellite receiver 300 may display graphics data representing a graphical user interface (GUI) that allows a user to control operations of the satellite receiver 300, and provides user access to services and options offered by the digital satellite TV system. For example, graphics on the TV set screen may represent a graphical channel changer that enables a user to select TV channels. Another example of a graphical presentation on the TV screen is an electronic program guide that contains names of TV programs arranged in a 2-dimensional array, in which TV channels are listed vertically, and the time of broadcasting is listed in the horizontal direction. Various aspects of the GUI including the graphical channel changer and the electronic program guide are discussed in more detail later.

A modem 340, such as a single-chip SSI 1200-baud modem, is provided to support communications via a narrowband port 342 used for low bandwidth signal transmission, or via a telephone jack connected to a telephone line. For example, the modem 340 may support remote billing and interactive services.

A microcontroller 344 such as a Phillips 87593 microcontroller provides control of receiver functions relating to control, interface and display devices arranged at the front panel of the satellite receiver 300. Among such devices are a pointing device interface 346, front panel controls 348, and a vacuum fluorescent display (VFD) 350.

The pointing device interface 346 enables a remote optical pointing device such as an Airmouse® to provide a wireless control of the satellite receiver 300. By way of example, reference is made to U.S. Pat. No. 5,045,843 to Hansen of Sep. 3, 1991, and U.S. Pat. No. 5,359,348 to Pilcher et al. of Oct. 25, 1994 for descriptions of Airmouse® arrangements and operation. For example, the pointing device interface 346 may comprise an infrared (IR) transmitter and receiver that provide infrared communications with a pointing device located up to 7 meters away from the receiver 300 at an angle of up to 45 degrees. This type of remote pointing device has been used principally for moving the cursor of a personal computer.

The Airmouse® type pointing device in accordance with the invention points directly at a TV set screen to provide direct interactions between the user hand that holds the pointing device, and the TV screen. The pointing device may comprise a cursor control circuit that moves a cursor on the TV screen in response to the position of the pointing device with respect to, for example, the IR transmitter at the front panel of the receiver. The pointing device interface 346 supports the GUI by providing and controlling the RF tuner 302 of the satellite receiver to respond to random, instant user access to any point on the TV screen. Selections are made by clicking one of the buttons on the pointing device. For example, at any time when there are no graphics on the screen, a click brings up graphical objects used in a channel changer mode. Interactions between the GUI and remote pointing device are disclosed in more detail in our copending application Ser. No. 08/720,501, entitled "TELEVISION GRAPHICAL USER INTERFACE EMPLOYING REMOTE RANDOM ACCESS POINTING DEVICE," now U.S. Pat. No. 5,835,156, filed concurrently herewith and incorporated by reference.

In addition to the optical pointing device, a remote hand held control unit of the satellite receiver 300 may also include several dedicated buttons to provide, for example, switching power ON and OFF, channel and volume control, selection between regular TV broadcasting and satellite broadcasting, etc.

The front panel control 348 provides control of the GUI in the event that the remote pointing device is missing or non-operable. The controls 348 may include a TV/Satellite receiver key for switching between regular TV broadcasting and satellite broadcasting. Set-up, menu, clear, select or "click" keys may be provided to control modes of operation. Cursor keys may be arranged to move the cursor on the TV screen in various directions.

The VFD 350 is provided to show current TV channel number and time. Also, the VFD 350 may indicate current incoming signal strength and other operational information.

Figure 2:
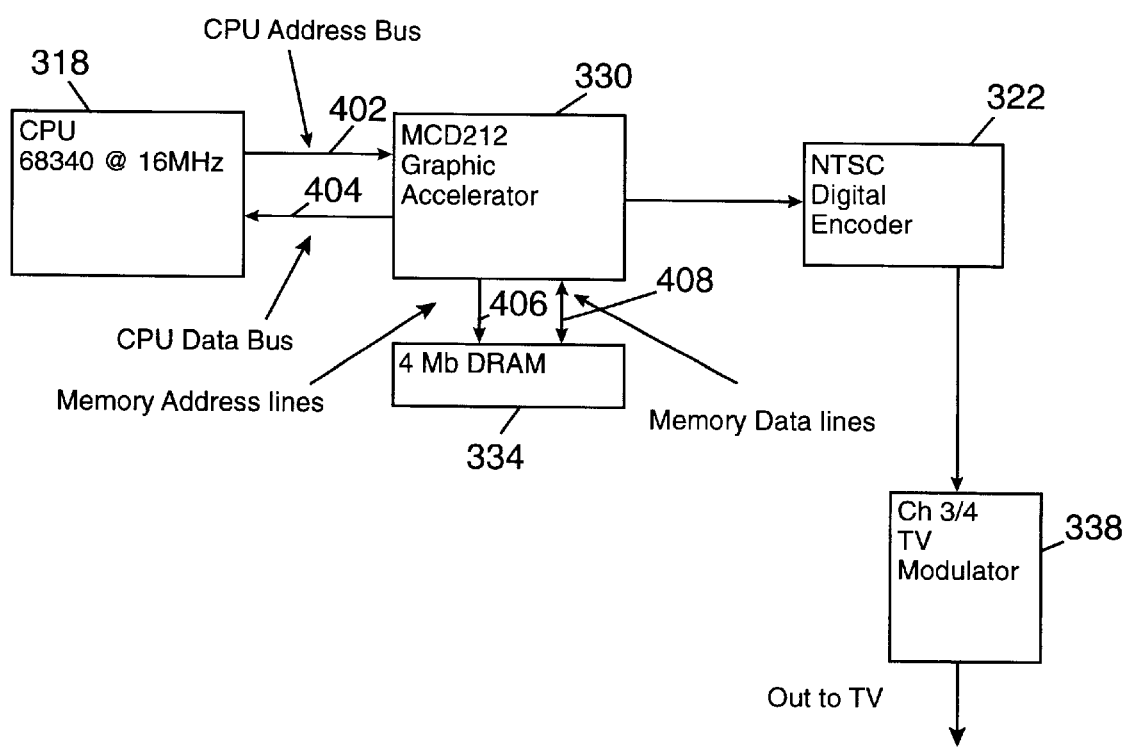
FIG. 2 is a block diagram illustrating a graphical object drawing procedure.

Reference is now made to FIG. 2 that illustrates drawing color graphic objects on a TV screen according to the present invention. As discussed above, the CPU 318 interacts with the graphics accelerator 330 used as a co-processor to enhance the graphics capability of the satellite receiver 300. The CPU 318 may be coupled to the graphics accelerator 330 via an external 24-bit address bus 402 and a 16-bit data bus 404. The 24-bit address bus 402 enables the CPU 318 to address up to 16 Mbytes of a graphics memory. This storage capacity corresponds to an address space from 000000 to ffffff in hexadecimal notation. Various graphics memory arrangements may be organized in this address space, as long as each memory location is uniquely addressable. For example, the capacity of the graphics memory 334 may be equal to 4 Mbit or 512 Kbytes. Assuming that the graphics memory address space corresponds to the middle part of the system memory map, the $800000 hex address may be selected as the lowest graphics memory location, and the $87ffff hex address may be designated as the top graphics memory address. The graphics memory 334 may be coupled to the graphics accelerator 330 via memory address lines 406 and memory data lines 408.

The graphics accelerator 330 enables a TV set to display up to 16 million different colors. However, only 256 different colors can be displayed on any one screen at any given time. As a result, each unique pixel displayable on a TV screen can be represented by a single 8-bit value. Thus, each pixel stored in the 512 Kbyte graphics memory 334 is represented by a single 8-bit value or byte.

Each graphics plane stored in the graphics memory 334 is provided by a rectangular array of 720×480 pixels representing a picture on the TV screen. For example, the pixels may be stored in the graphics memory 334 from top left to bottom right in row order. Thus, the top left hand pixel of the screen resides at the $800000 hex graphics memory location. The second pixel on the top line 1 is stored at $800001 hex, etc. The last pixel of the top line 1 is held at $8002D0 hex. The first pixel of the next line 2 is at the $8002D1 hex graphics memory location, etc. The bottom right hand corner of the screen corresponds to the $8545ff location of the graphics memory 334. Thus, the graphics memory arrangement corresponds to a rectangular X,Y-coordinate system on the TV screen, where 720 pixels in each line of the array are arranged in the horizontal direction X, and 480 pixels in each row of the array are arranged in the vertical direction Y.

The graphics accelerator 330 contains a color look up table (CLUT) that converts 256 elements representing 8-bit pixel values stored in the graphics memory 334 into 24-bit values composed of red (R), green (G), and blue (B) bytes corresponding to R, G, and B components of a picture in RGB format. The CLUT may be programmed by the CPU 318 to reproduce any color possible in a 24-bit color space.

FIG. 3 illustrates some typical colors reproducible by the CLUT. For example, black color composed of red, green and blue bytes represented by $0 hex may correspond to the $0 hex location of the CLUT. White color composed of the $ff hex red, green and blue bytes may correspond to the $4 hex CLUT location, etc.

When the CLUT is programmed, the CPU 318 accesses the graphics memory 334 to write data values representing graphics. The graphics accelerator 330 scans the graphics memory 334 at a rate of 13.5 MHz to read the graphics data. Each 8-bit pixel value is transferred to the CLUT that converts it into a 24-bit color value in RGB format. As discussed above, the converter 332 converts the RGB color value into YUV format, and passes a 24-bit digital YUV value to the digital encoder 322 that converts it into analog NTSC luminance and chrominance signals, for example, at a 13.5 MHz rate. The NTSC encoding procedure carried out by the encoder 322 is well known to those skilled in the art. The analog luminance and chrominance signals via the TV modulator 338 are supplied to the TV set.

Figure 4:
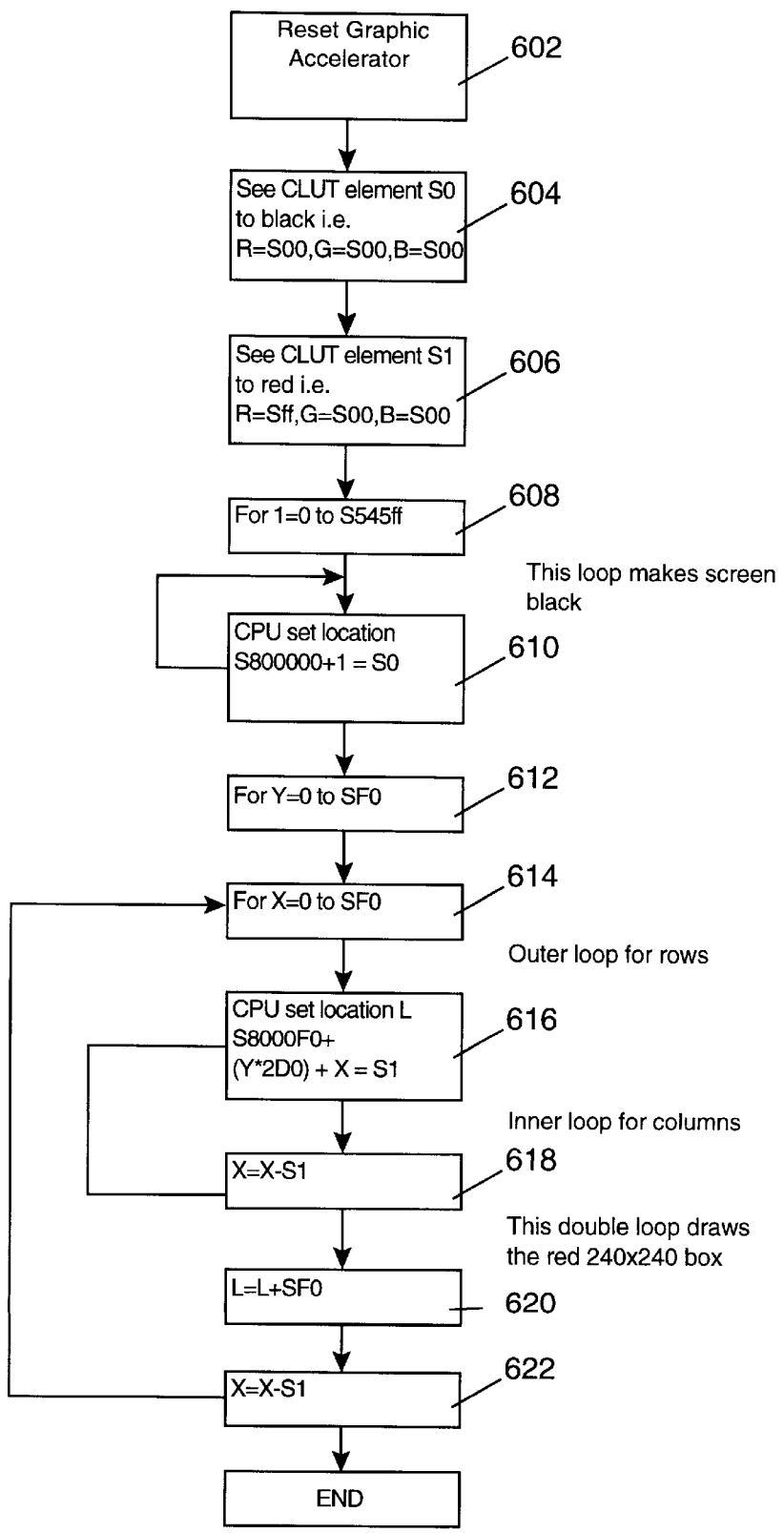
FIG. 4 is a flow chart illustrating an example of interactions between a CPU and graphics accelerator.

FIG. 4 shows a flow chart that illustrates an example of interactions between the CPU 318 and graphics accelerator 330 to draw a 240×240 pixel red square in the middle of a TV screen with a black background. In step 602, the CPU 318 resets the graphic accelerator 330. In step 604, the CPU 318 programs the CLUT in the graphics accelerator 330 so as to set CLUT location $0 hex to reproduce black color, i.e. red, green and blue bytes in this location are set to $0 hex. In step 606, the CPU 318 sets CLUT location $1 hex to reproduce red color, i.e. a red byte in this location is set to $ff hex, and green and blue bytes are set to $0 hex.

In steps 608 and 610, the CPU 318 carries out a loop to make the TV screen black. Locations $800000+I of the graphics memory 334 are set to $0 hex, for I that varies from $0 hex to $545ff hex.

In steps 612–622, the CPU 318 performs a double loop to draw the red 240×240 pixel box on the screen. The double loop comprises an outer loop carried out to set pixels in rows (Y-direction on the screen) of the graphics memory 334 to $1 hex to reproduce them in red color, and an inner loop to set pixels in lines (X-direction) of the graphics memory 334 to $1 hex to reproduce them in red color.

Figure 5:
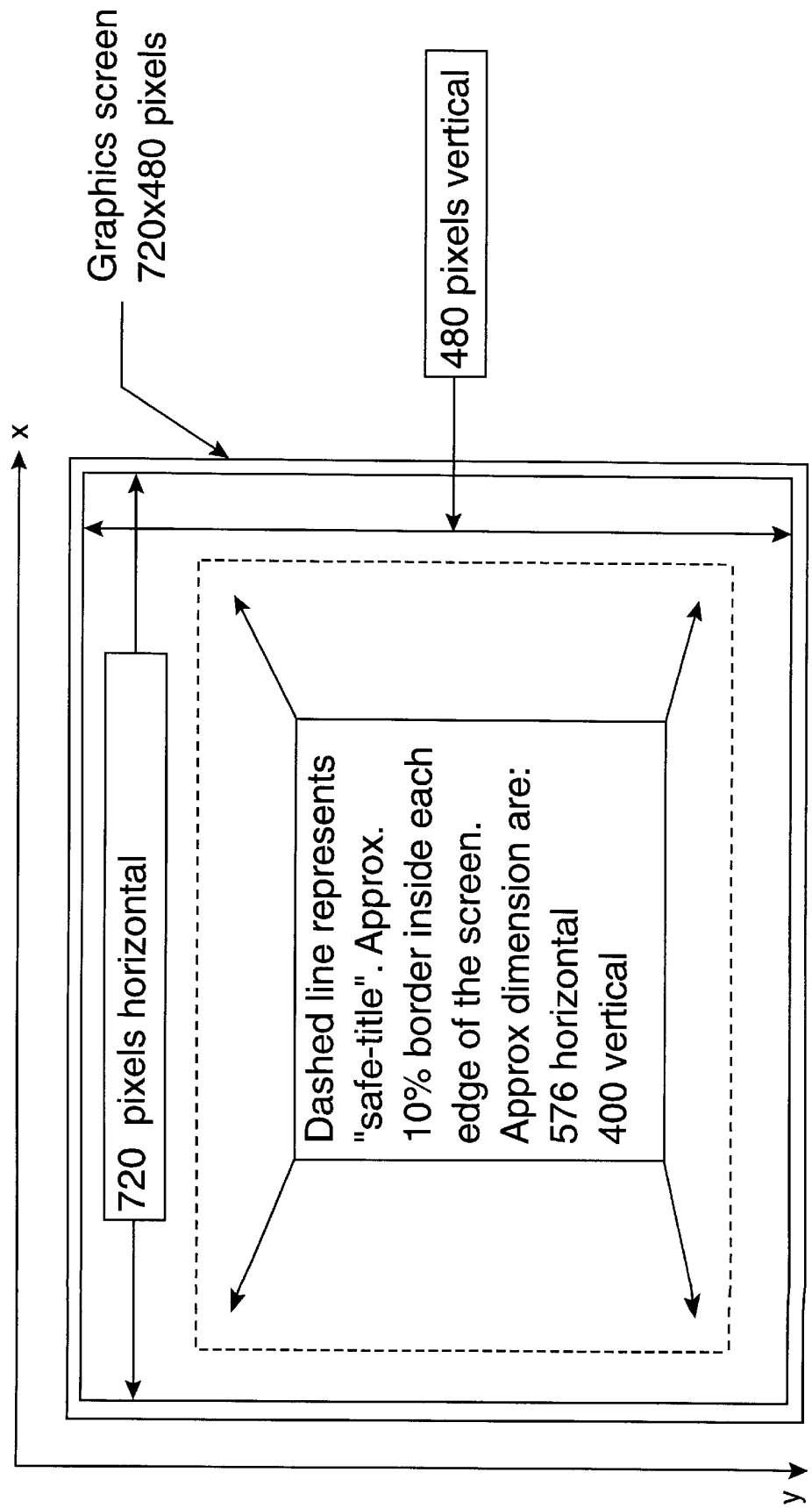
FIG. 5 is a diagram illustrating arrangement of pixels on a TV screen.

Graphical objects displayed on the TV screen are represented by a 2-dimensional array of pixels. For example, as shown in FIG. 5, the TV screen may be represented by a 720×480 array of pixels corresponding to a graphics plane stored in the graphics memory 334. 720 pixels may be arranged on the screen in the horizontal direction X, whereas 480 pixels may be arranged in the vertical direction Y. To perform graphics drawing operations, the CPU 318 may use an X, Y-coordinate system shown in FIG. 5, wherein coordinates X=0, Y=0 represent the top left hand corner of the TV screen, and coordinates X=720, Y=480 represent the bottom right hand corner of the screen.

Reference is now made to FIG. 6 showing the TV GUI of the present invention displayed on a TV screen in a dish set-up mode that enables users to input installation location for pointing the dish antenna 202. Also, in this mode, the user may check the signal being received by the antenna 202.

As discussed above, the direct TV satellite 100 provides direct broadcasting of TV signals to the antenna 202 of the satellite receiver from a synchronous orbit. Therefore, antenna pointing parameters, such as magnetic north and elevation values, depend on the location of the satellite receiver on the earth.

The TV GUI displays a dish set-up form 800 for enabling the user to manually input latitude and longitude values that define the current location of the satellite receiver. For example as shown in FIG. 6, the 35.5° North latitude, and 114.8° West longitude may be manually entered to represent the receiver location.

Alternatively, postal zipcode may be manually entered to define the current receiver location. The CPU 318 converts the postal zipcode value into central latitude and longitude values for the postal region represented by the zipcode. The front panel control keys 348 may be used for the manual entry of digits that represent latitude and longitude values, or zipcode.

The latitude and longitude values entered manually or determined by the CPU 318 are used by the CPU 318 to calculate the magnetic north and elevation values for pointing the antenna 202. A conventional antenna orientation device provides pointing of the dish antenna 202 in response to the calculated magnetic north and elevation values. Programs for determining central latitude and longitude values for a postal region, and for calculating magnetic north and elevation values are well known to one skilled in the direct satellite TV art.

The calculated magnetic north and elevation values may be displayed in the dish set-up form 800. For example as shown in FIG. 6, the calculated magnetic north and elevation values respectively equal to 143° and 46° are indicated on the screen.

The TV GUI in the dish set-up mode displays a current signal strength indicator 802 having scale from 0 to 100 to indicate the strength of the current signal being received by the antenna. The dish set-up form 800 allows the user to select a transponder arrangement in the receiver to measure signal strength during the antenna set-up.

A button Cancel 804 may be used to cancel any changes made on the screen. A button U.S. Map 806 allows the user to input the receiver location using graphical information on the screen.

Figure 7:
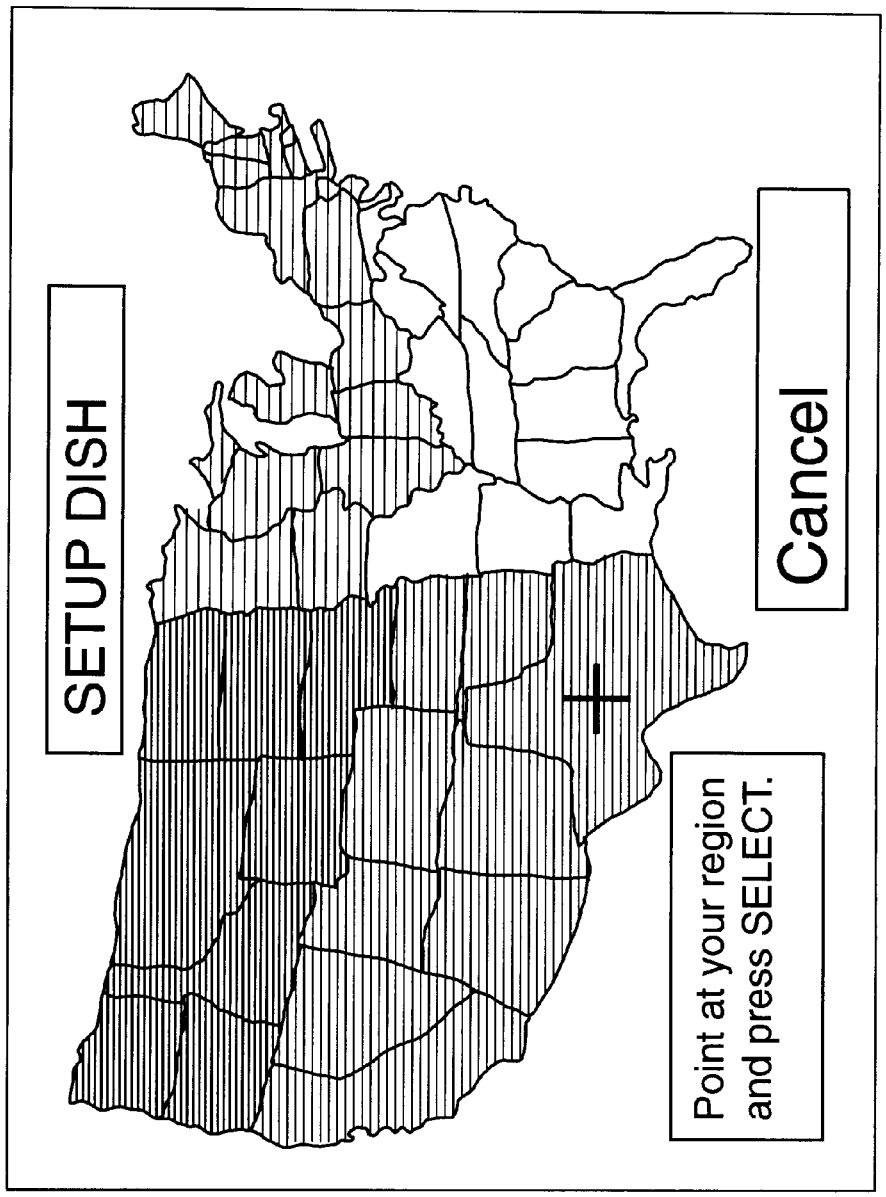
FIG.7 is a diagram showing a map of the United States displayed on the TV screen.

Referring to FIG. 7, when the U.S. Map button 806 is activated by the remote pointing device, the TV GUI displays a map that shows a predetermined area of the world. For example, a map of the United States may be displayed. The data for displaying the map may be stored in the ROM 324 or EEPROM 328.

When the user moves the remote pointing device in the direction of a point that represents the receiver location on the map, the coordinates of the pointing device are supplied to the microcontroller 344 on a periodic basis, for example, 60 times a second. The CPU 318 generates X, Y coordinates corresponding to a path for moving the cursor on the TV screen in alignment with pointing device movement. Cursor movement is achieved by multiple erasures and redraws of the cursor image performed on the path to the selected position. When the cursor reaches the receiver location on the U.S. map, the user may press a select button on the pointing device to select a region where the receiver is located.

Figure 8:
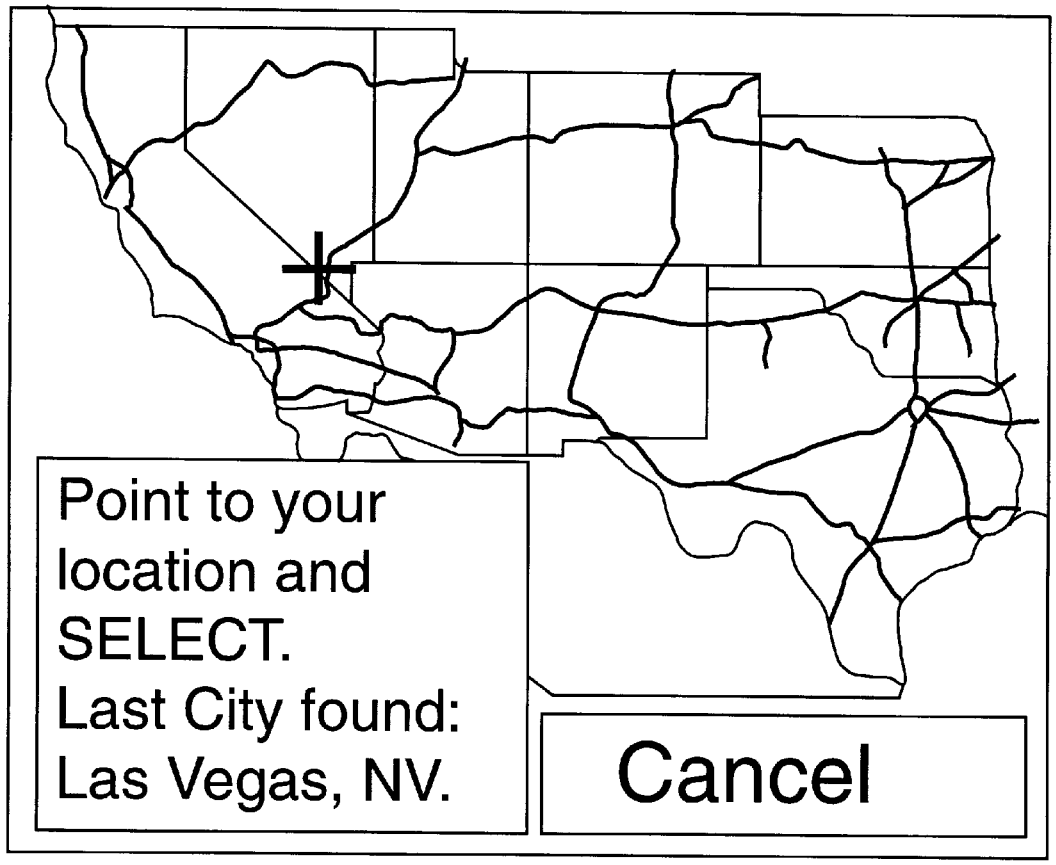
FIG. 8 is a diagram illustrating a regional map that enables a user to define an antenna location more accurately.

In response as shown in FIG. 8, the TV GUI displays a regional map showing the selected region in more detail to enable the user to define the receiver location more accurately. For example, the regional map may be represented by a 400×330 pixel array to provide a resolution higher than 4 miles per pixel.

The ROM 324 or EEPROM 328 may store data for displaying predetermined regions within the area shown in FIG. 7. The CPU 318 controls the GUI to display the region that corresponds to the coordinates of the pointing device at the position selected by the user.

The regional map is arranged so as to have the latitude lines perpendicular to the longitude lines. Such an arrangement allows the latitude and longitude values of the current receiver location to be linearly interpolated from the latitude and longitude lines of the regional map.

When the user directs the remote pointing device at a point that represents the receiver location on the regional map, the TV GUI displays the name of the city or town nearest to the selected location to provide the user with visual feedback. For example, FIG. 8 shows that Las Vegas, Nev. is the nearest city. The information representing locations of various places on the map may be stored in the ROM 324 or EEPROM 328.

When the user presses the select button, the CPU 318 determines the coordinates of the pointing device at the selected location on the regional map. As the latitude lines on the regional map are perpendicular to the longitude lines, the CPU 318 interpolates the latitude and longitude values of the selected location based on the X, Y coordinates of the pointing device in the rectangular coordinate system shown in FIG. 5. Then, the CPU 318 converts the interpolated latitude and longitude values into the magnetic north and elevation values for antenna pointing using a conventional program well known to one skilled in the satellite TV art. Due to the high resolution of the regional map, the magnetic north and elevation values may be calculated with accuracy within 0.5°.

In response to a selection made on the regional map, the TV GUI returns to the dish set-up form 800 illustrated in FIG. 7 to display the magnetic north and elevation angles calculated by the CPU 318. Also, to provide the user with additional feedback, the dish set-up form displays a distance between the selected receiver location and the nearest place on the map. The ROM 324 or EEPROM 328 may store latitude and longitude values of selected places on the map to enable the CPU 318 to calculate a distance from them to the receiver location. For example, as shown in FIG. 6, the TV GUI indicates that the selected location is at 50 miles south of Las Vegas, Nev. In response to the magnetic north and elevation values supplied by the CPU 318, a conventional antenna pointing device provides pointing of the dish antenna 202.

If the user needs to correct the selected position, the U.S. map button 806 may be activated to display an area map shown in FIG. 7 to enable the user to repeat the location selection procedure. To cancel any changes, the cancel button 804 may be activated to return the TV set to normal viewing. The graphical objects displayed in various GUI modes illustrated in FIGS. 6–8 are drawn in accordance with the graphical object drawing procedure discussed above in connection with FIGS. 2–4.

There accordingly has been described a TV graphical user interface (GUI) that enables a user to input receiver location information required for setting up a dish antenna. When the TV GUI is set in a dish set-up mode, the user may activate a U.S. map button to display a map of the United States or another area on the earth's surface. When a remote pointing device is directed at a point on the map that represents the current location of a satellite receiver, the TV GUI displays a regional map that shows in more detail a region where the receiver is located. When the user selects the receiver location within the regional map, the CPU determines the latitude and longitude values of the selected location, and calculates magnetic north and elevation angles for the antenna installation. The TV GUI may show the city nearest to the selected location, and a distance to the nearest city, to provide the user with visual feedback.

Thus, in accordance with the present invention, no manual entry of digits that represents latitude and longitude values or zipcode of a receiver location is required.

Also, the graphical data input of the present invention allows the magnetic north and elevation values to be calculated with an accuracy within 0.5 degree. Thus, calculation accuracy is substantially improved compared with a conventional zipcode entry method that may have a calculation error higher than 2 degrees.

In this disclosure, there are shown and described only the preferred embodiments of the invention, but it is to be understood that the invention is capable of changes and modifications within the scope of the inventive concept as expressed herein.

We claim:

1. A satellite TV system comprising:
   a satellite for providing TV broadcast,
   a receiver having a CPU, and an antenna for receiving TV signals from said satellite,
   a TV monitor controlled by said CPU for displaying an area map showing an area including a location of said antenna, and
   a pointing device for enabling a user to point at said location to provide antenna installation information for pointing said antenna at said satellite.

2. The system of claim 1, wherein said CPU is configured to control said TV monitor to further display a regional map showing a region of said antenna in more detail than the area map.

3. The system of claim 2, wherein said regional map is displayed when said pointing device is directed at said location on said area map.

4. The system of claim 3, wherein said CPU determines latitude and longitude values of said location when said pointing device is directed at said location on said regional map.

5. The system of claim 4, wherein said regional map has latitude and longitude lines.

6. The system of claim 5, wherein said CPU calculates parameters for pointing said antenna at said satellite based on said latitude and longitude values.

7. The system of claim 6, wherein said CPU is configured to control said TV monitor to further display an antenna set-up form including said pointing parameters calculated by said CPU.

8. The system of claim 7, wherein said antenna set-up form further includes identification of a distance from said location to a selected place on said regional map to provide the user with a visual feedback.

9. The system of claim 8, wherein said CPU is configured to control said TV monitor to further display an indicator for indicating strength of a current TV signal received from said satellite.

10. The system of claim 9, wherein said antenna set-up form further includes latitude and longitude values of said location manually entered by the user.

11. The system of claim 10, wherein said antenna set-up form further includes postal zipcode of a postal region where said antenna is located, manually entered by the user.

12. A TV system comprising:
    a receiver having an antenna, and a CPU,
    a monitor controlled by said CPU for displaying a picture indicating a location of said antenna, and
    a pointing device for pointing at said position on the picture to determine coordinates of said location.

13. The system of claim 12, wherein said picture comprises a map showing a region that includes said location.

14. The system of claim 13, wherein said CPU determines latitude and longitude values of said location on the map based on coordinates of a cursor on said monitor.

15. The system of claim 14, wherein said CPU calculates parameters for installation of said antenna based on said latitude and longitude values.

16. The system of claim 15, wherein said monitor further indicates a name of a place near said location.

17. The system of claim 16, wherein said monitor further indicates a distance from said place to said location.

18. A method of providing a satellite receiver with position information for pointing an antenna at a satellite, comprising the steps of:
    displaying a map showing an antenna location on a TV screen,
    moving a cursor to said antenna location,
    determining latitude and longitude values of the antenna location based on coordinates of the cursor, and
    calculating antenna pointing parameters using the latitude and longitude values of the antenna location.

19. The method of claim 18, wherein said step of displaying a map comprises the step of displaying an area map showing an area including the antenna location, and the step of displaying a regional map showing a region of the antenna location within the area.

20. The method of claim 19, wherein the regional map is displayed when the cursor is moved to the antenna location on the area map.

* * * * *